United States Patent [19]
Carless

[11] 3,779,621
[45] Dec. 18, 1973

[54] RECORD ALBUM STORAGE CABINET

[76] Inventor: Ernest Lee Carless, 475 N. Eton Rd., Birmingham, Mich. 48008

[22] Filed: July 3, 1972

[21] Appl. No.: 268,657

[52] U.S. Cl. .................... 312/15
[51] Int. Cl. .................... A47b 81/06
[58] Field of Search .................... 312/9, 10, 15, 18, 312/234.1, 234.3; 40/104.01, 104.03, 104.05, 104.11

[56] References Cited

UNITED STATES PATENTS

| | | | |
|---|---|---|---|
| 1,360,680 | 11/1920 | Pomeroy et al. | 312/15 |
| 1,167,063 | 1/1916 | Haag | 312/15 |
| 2,330,173 | 9/1943 | Gordon et al. | 312/15 |
| 1,302,849 | 5/1919 | Rand | 40/104.05 |

*Primary Examiner*—James C. Mitchell
*Attorney*—Bernard J. Cantor

[57] ABSTRACT

An open front cabinet having a plurality of upper, narrow tracks vertically aligned with corresponding lower tracks extending from front to rear of the cabinet for storing narrow, flat, record albums and the like in a vertical plane, with the upper and lower edges of each album slidably fitted within a pair of aligned upper and lower tracks. A pivotable lever is arranged at the rear of each such pair of aligned tracks for pivoting into the space therebetween and engaging the rear vertical edge of an album stored therein and for pushing it forwardly upon pivoting of the lever. Said levers are alternatingly mounted at the lower tracks of one pair and at the upper track of the next adjacent pair of aligned tracks. Each lever is pivotally actuated by a lever push rod which extends from the lever to the open front of the cabinet and terminates in a manual push button for selectively pushing the rod rearwardly and thus pivoting its respective lever forwardly for pushing a pre-selected album forwardly of its tracks. The alternating push rods are located between the upper tracks and the top of the cabinet and between the lower tracks and the bottom of the cabinet, so that each push button may be almost as wide as two adjacent tracks.

4 Claims, 7 Drawing Figures

RECORD ALBUM STORAGE CABINET

BACKGROUND OF INVENTION

Flat, disk type phonograph records are conventionally stored within flat, generally square-shaped folders containing one or more records, which folders are normally stored in the vertical plane upon one edge thereof within a suitable cabinet or container. Each such folder may form an album of one or more records, with the user removing the record from the folder and placing it upon a conventional phonograph play-back machine when desired.

Owners of such phonograph equipment conventionally have numerous albums and store them face to face, on edge in a vertical plane, with the result that it is difficult to locate and select a particular album without moving or reviewing a large number of them. Where such albums are stored in an open top container as is conventional, as more albums are placed within the container it becomes that much more difficult to move them and review each of them to locate the desired one. Moreover, the containers may not be fully utilized since packing the albums too close together makes it too difficult or almost impossible to move them while within the container to locate a specific desired album. Thus, this invention relates to an improvement in record album storage cabinets wherein the records may be stored, within their folders or albums, on edge, in a vertical plane, but may be easily pre-selected and moved from the group of albums when desired.

SUMMARY OF INVENTION

The invention herein contemplates forming a record album storage cabinet in the form of a container having an open front which may be closed by a suitable door, and wherein the records, within their folders, are stored on edge adjacent one another but within aligned upper and lower tracks within which the albums may be forwardly and rearwardly slid. A mechanism is provided for pushing a pre-selected ablum forwardly out of the open front of the cabinet in response to pressing a button which actuates the mechanism for each specific stored album. A suitable index system is also provided so as to locate each album, in relation to the respective button to be pressed to select that album.

More specifically the invention herein contemplates providing a plurality of upper and lower tracks extending from front to rear of an open front cabinet, with pivotable levers located at the rear of each pair of aligned tracks, the levers being actuatable by means of pressing a button connected to a rod which in turn pushes the lever and causes it to pivot towards the front of the cabinet, thereby engaging and pushing forwardly a pre-selected album located between any pair of aligned upper and lower tracks, By alternating the position of the levers and their actuating rods, that is by placing one lever at the bottom of the cabinet and the next lever at the top of the cabinet and so forth, ample room is provided at the front of the cabinet for enlarged push buttons for easily pushing each rod for actuating the levers.

With this storage cabinet, a much larger number of records or albums may be stored within the available space since the records or albums are slid on end for selection. Thus, the records may be more tightly packed together in face to face relationship, thereby utilizing the available cabinet storage area more fully.

Moreover, the actuating mechanism for removal and selection of the desired records is simple, inexpensive, with limited moving parts and thus free of maintenance as well as having all the moving parts concealed out of reach of the user of the cabinet to avoid damage or breakage thereof or interference with its normal operation. These and other objects and advantages of this invention will become apparent upon reading the following description, of which the attached drawings form a part.

DETAILED DESCRIPTION

Figures 1, 2:
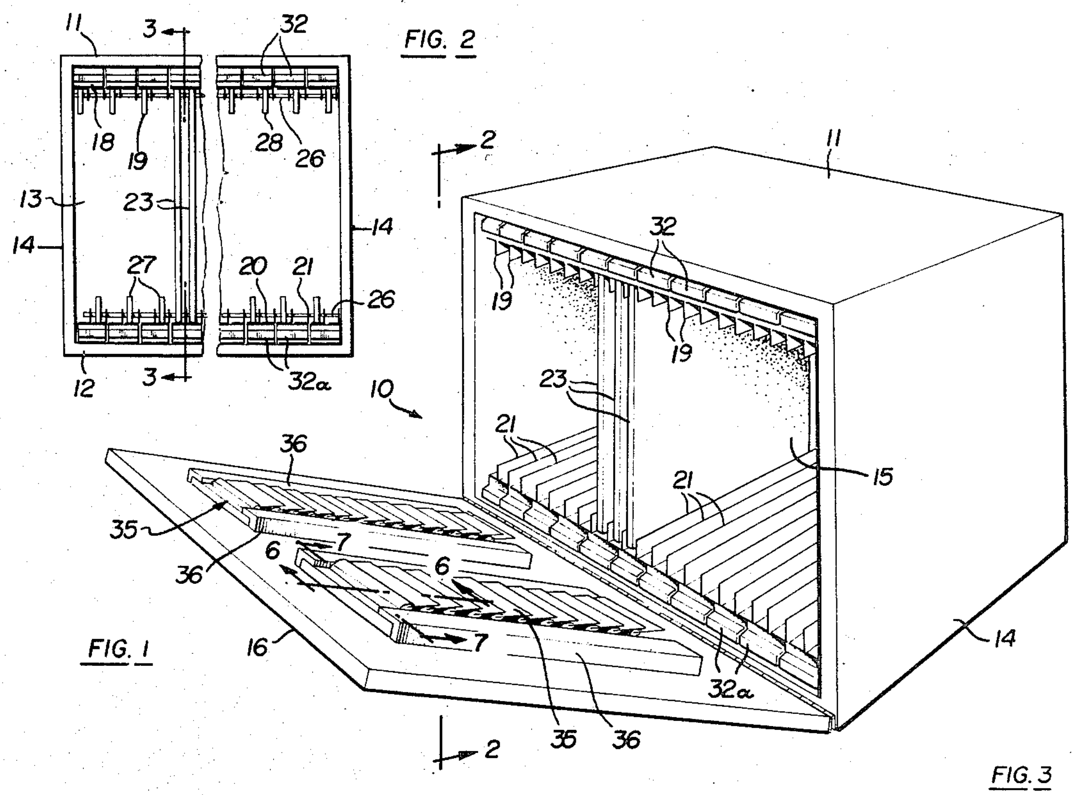
FIG. 1 is a perspective view of the record album storage cabinet herein, with the forward or front door shown in the open position.
FIG. 2 is a front elevational view taken in the direction of arrows 2—2 of FIG. 1.
Figure 3:
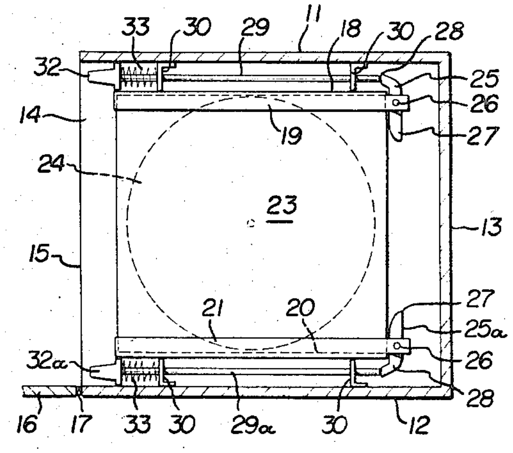
FIG. 3 is a cross-sectional side view taken in the direction of arrows 3—3 of FIG. 2.
Figure 4:
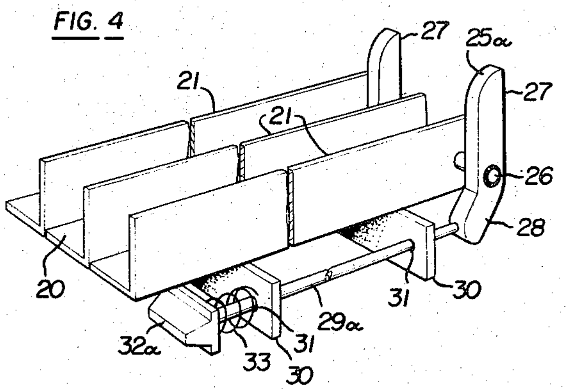
FIG. 4 is a perspective, fragmentary view of the lower operating mechanism portion.
Figure 5:
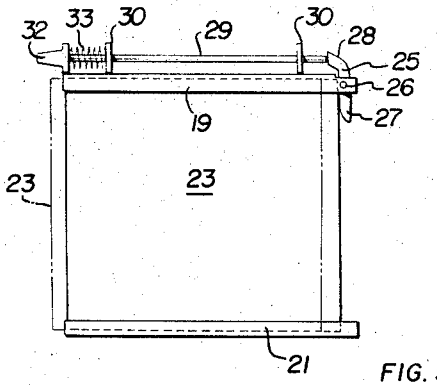
FIG. 5 is an elevational view of a portion of a cabinet showing an upper operating mechanism.

FIGS. 1–3 illustrate a record album storage cabinet 10 comprising a box-like container having an upper wall 11, a bottom wall 12, a rear wall 13 and side walls 14. The open front 15 of the container is closed by a suitable door 16, connected by hinges 17 to the lower wall 12. In effect, the cabinet consists of a box whose front wall is open and is closed by a suitable door.

Within the container, an upper, flat plate 18 is mounted a short distance beneath the upper wall. The plate is provided with numerous, closely spaced flanges 19 extending from front to rear of the container. A corresponding lower plate 20 is mounted a short distance above the bottom wall 12 of the container and is provided with upwardly extending flanges 21. The flanges 19 and 21 of the upper and lower plates are vertically aligned so as to form vertically aligned pairs of tracks which extend from front to rear of the container and which are sufficiently narrow so as to hold one or perhaps two normal record albums or record containing folders. FIG. 3 illustrates such an album or folder 23 stood on edge, that is, arranged in a vertical plane, with its upper edge fitted into an upper track and its lower edge fitted into a lower track so as to store its record 24 (shown in dotted lines) in the vertical plane.

The album or folder 23 and the phonograph album 24 are of conventional construction. A number of such albums containing records are inserted within the cabinet, side by side, in the vertical plane. During ordinary storage, the door 16 is closed and the cabinet gives the appearance of a closed box.

Where the user desires to remove a specific record, a mechanism is provided for dispensing or pushing forward the album which he has selected. Such mechanism includes a pivotal lever arranged at the rear of each pair of aligned upper and lower tracks for engaging and pushing forward the album contained within that pair of tracks. The levers are formed in a bent or V-shape and are arranged in groups of upper levers 25 and lower levers **25*a*** in an alternating fashion, that is, every other lower track is provided with such a lever and every intermediate upper track is provided with such a lever so that they alternate.

Each lever is connected by a pivot pin 26 to the end of the flanges forming its specific track so that one end of the lever 27 is arranged within the space between the aligned pair of tracks for engaging the rear edge of the album stored therein. The opposite end 28 is engaged by a push rod which extends to the open front of the cabinet. Thus, push rods 29 are arranged between the upper plate and the upper wall and push rods **29*a*** are arranged between the lower plate and the bottom wall.

Each of said rods 29 and **29*a* are positioned by rod bracket strips 30 secured to the respective plates, with the strips having holes 31** through which their respective rods pass.

The forward free end of each rod is provided with an enlarged manually engageable push button (32 on the upper rods and **32*a*** on the lower rods).

In operation, the user of the cabinet inserts a number of albums, in vertical position, into the cabinet, each album being arranged within a pair of aligned upper and lower tracks. To remove a specific album, the user presses the button 32 or **32*a*, corresponding to the tracks within which that album is stored. Thus, he may press either a lower button or an upper button, depending upon the track involved. Upon pressing the button, the push rod moves rearwardly, engaging one end of its respective lever and causing the lever to pivot so that its opposite end, engaging the rear edge of the desired album, pushes that album forwardly a sufficient distance so that the user may then grasp the album with his fingers and pull it out of the cabinet. Coil springs 33 arranged between each of the push buttons and bracket strips 30**, return each pushed button to its normal position.

Figure 6:
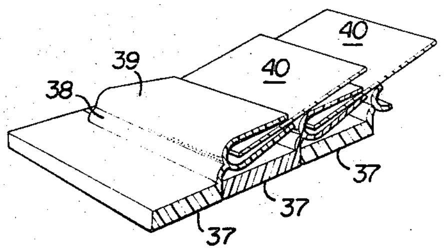
FIG. 6 is an enlarged, fragmentary cross-sectional view of a portion of the index means taken on arrows 6—6 of FIG. 1.
Figure 7:
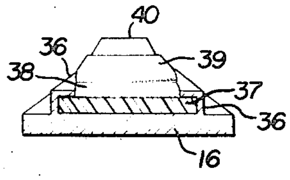
FIG. 7 is a cross-sectional elevational view of a portion of the index means taken in the direction of arrows 7—7 of FIG. 1.

In such a system, each pair of aligned tracks and the albums contained therein must be identified. While any suitable card index system may be used, e.g., a list of albums correlated to numbers imprinted upon the buttons, one preferred system is illustrated in FIGS. 6 and 7.

The system illustrated generally designated as 35, consists of a pair of opposed channels 36 mounted upon the inner surface of the door 16 and opening towards each other. Slidably arranged between the channels and held therebetween by the channel shapes, are a number of flat blocks 37 which may be made of a plastic extrusion having an integral flexible hinge portion 38 which terminates in a springy channel or clamping edge 39. Ordinary index cards 40 may be slipped into each of springy channels 39 and recorded upon each of said cards may be the name of the album and the particular numbered push button which will serve to select such albums. The blocks 37 span the distance between the two channels 36 and are arranged in end to end contact, wherein their flexible hinge portions 38 may be folded downwardly so as to overlap the cards contained within the springy grasping channel 39, wherein each card is exposed a short distance beyond the edge of its overlapped card, for easy identification. In this system, the cards may be changed when desired and also the blocks may be changed or moved about in their relative positions and more or less blocks used as needed. In addition, the index cards may be permanently fastened, as by suitable adhesive to their respective springy channel 39, in which case rearrangement of the location of the records within the cabinet, can be easily done simply by rearranging the blocks upon which the identification of the records is written and merely changing the number of the particular buttons to which those cards correspond.

Having fully described an operative embodiment of this invention, I now claim:

1. A storage cabinet for thin, flat, roughly square, stiff envelope-like folders, such as cardboard folders and record albums for containing circular record disks, comprising:

a container having an open front, and top, bottom, rear and side walls;

an upper plate located a short distance beneath the upper wall and a lower plate located a short distance above the lower wall, with each plate having a plurality of parallel flanges extending from the forward to the rear end of the container to form a plurality of adjacent U-shaped tracks on each plate, with the tracks on the upper plate being parallel to, vertically aligned with, opening towards and spaced from the corresponding tracks on the lower plate to thus form pairs of aligned upper and lower tracks arranged for receiving and storing such folders therebetween with the upper and lower edges of said folders respectively received within the respective pair of aligned upper and lower tracks and the folders being slidably movable forwardly and rearwardly of the cabinet relative to its pair of tracks;

means for selectively pushing each folder a short distance forwardly of its respective pair of tracks, said means each comprising a short lever pivotally mounted between its ends at the rear of its respective tracks for pivotal movement of one end, namely a pushing end, of the lever into the space between its pair of tracks for engaging and pushing forwardly the rear vertical edge closely adjacent to a horizontal edge of its adjacent folder;

with said one end of the lever having the forward facing portion curved for slidingly contacting the folder vertical edge along a point on the curve for thereby exerting a horizontally forwardly directed force upon the folder;

and each lever having a long push rod extending the length of the tracks and having a rear end engaged with the opposite end of the lever for pushing it rearwardly, with means mounting said rod for substantially forwardly and rearwardly lengthwise movement only, and with a manual push portion formed on the forward end of the rod and located at the front of the cabinet;

wherein rearwardly directed manual pushes upon the manual push portion of a selected rod causes the lever of that rod to push its adjacent album forwardly of the front of the cabinet for manually grasping and removing that album from the cabinet.

2. A cabinet as defined in claim 1, and said rear end of said rod being abutted against the forwardly facing portion of said lever opposite end, and said lever being roughly V-shaped, i.e., with its opposite end normally extending forwardly of its pivot and its said lever pushing end normally extending vertically relative to the pivot, with all of the levers being closely adjacent to the cabinet rear wall.

3. A cabinet as defined in claim 2, and including a compression spring engaged with each rod for spring resisting rearward movement of the rod and spring forcing the rod forwardly into a normal forward position.

4. A cabinet as defined in claim 1, and wherein said means for pushing each folder from each adjacent pair of tracks are alternatingly located above the lower plate and below the lower plate, wherein the push portions of the group of rods located below the plate and their corresponding levers may be operated for pushing forwardly the folders stored in every other pair of aligned tracks, with the folders stored in the tracks therebetween being forwardly movable by pushing the portions of the groups of rods located above the upper plate;

and all of the push portions of each of said upper and lower groups of rods being horizontally aligned into an upper row and a lower row at the front of the cabinet, with each said push portion being widened to span about two adjacent tracks.

* * * * *